L. L. SAVOIE & E. F. GENEVAY.
VEHICLE TIRE.
APPLICATION FILED APR. 16, 1913.
1,089,676.
Patented Mar. 10, 1914.
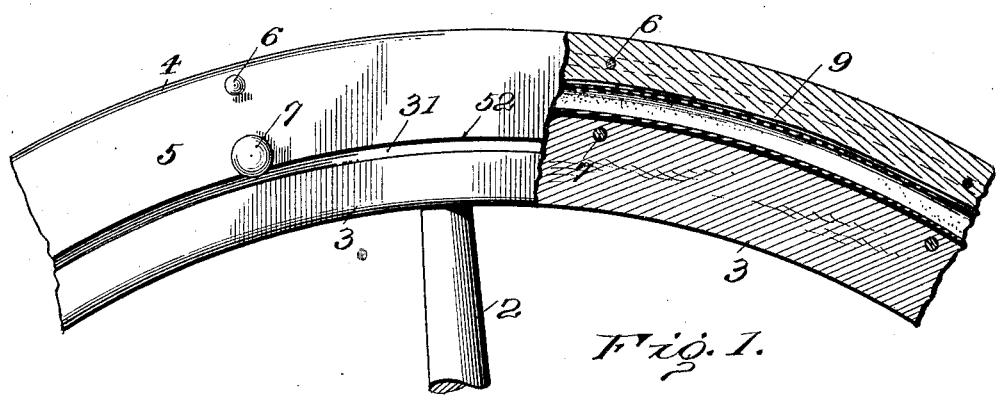
Fig. 1.
Fig. 2.
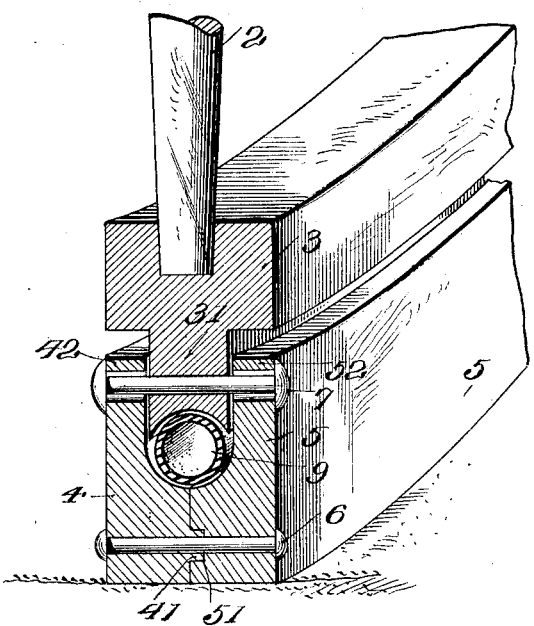
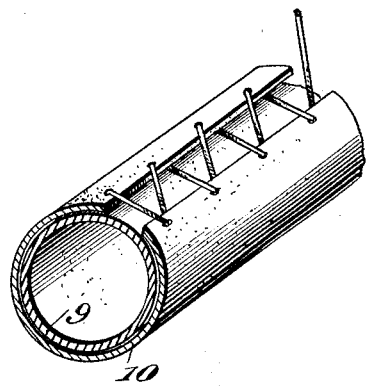
Fig. 3.
Witnesses
T. B. Watkins
L. Schaufschwerdt
Inventors
Leo L. Savoie
Emile F. Genevay
By
John P. Baldwin
Attorney
COLUMBIA PLANOGRAPH CO., WASHINGTON, D. C.

UNITED STATES PATENT OFFICE.

LEO L. SAVOIE AND EMILE FRANÇOIS GENEVAY, OF NEW ORLEANS, LOUISIANA.

VEHICLE-TIRE.

1,089,676.  Specification of Letters Patent.  Patented Mar. 10, 1914.

Application filed April 16, 1913. Serial No. 761,593.

*To all whom it may concern:*

Be it known that we, LEO L. SAVOIE and EMILE F. GENEVAY, citizens of the United States of America, residing at New Orleans, in the parish of Orleans and State of Louisiana, have invented certain new and useful Improvements in Vehicle-Tires, of which the following is a specification.

The object of our invention is to provide an improved construction of wheel for vehicles, and more particularly a wheel for automobiles and the like wherein the resilient features of the pneumatic cushion may be employed without the liability to injury from puncture and like causes to which the ordinary pneumatic tired wheel is exposed.

In the accompanying drawings: Figure 1 shows a side elevation of a portion of the wheel with parts broken away. Fig. 2 shows a transverse section and a portion in perspective of the wheel. Fig. 3 is a view of the inner or pneumatic tube and a protective casing which may be preferably employed.

The wheel is of the usual interior construction with any desired form of hub, not shown, from which radiate the spokes 2. The outer ends of spokes are secured in and support the inner rim of felly 3. This felly in transverse section is of a substantially T shape, to provide a circumferential rib 31 with the bottom or end 32 of the leg portion of the T or face of the rib curved or recessed on an arc of a greater radius than the radius of the inner pneumatic tube. The outer rim or tire of the wheel comprises two sections 4 and 5 which when fitted and secured together are recessed to fit over the leg or rib of the felly. Section 4 is provided with a rib 41 which fits into a corresponding groove 51 formed in section 5, and when the two sections are bolted together as by the bolts 6, the interfitting rib and groove interlock the sections to enable them to withstand a transverse strain such as would be caused by the passage of the wheel over an uneven surface, as a pebble. The upper ends 42 and 52 of the sections of the tire or rim fit as stated against the sides of the medial projecting rib 31 of the felly sufficiently close to prevent the entrance of dirt or gravel. Bolts 7 pass through the rib of the felly and also through enlarged openings 8 in the upper ends 42 and 52 of the rim, and the openings 8 are sufficient to permit considerable movement or play of the rim upon the felly. A pneumatic tube of rubber or like material is placed within the recess between the face of the rib of the felly and the bottom of the groove between the sections 4 and 5 of the outer rim or tire. As shown this recess is of elliptical shape in cross section to provide room for lateral expansion of the tube when by reason of a jar or shock the outer rim or tire would be driven on the felly. A casing 10 of leather or canvas may be employed to cover and protect the pneumatic tube when an ordinary rubber tube such as the common inner tube of a pneumatic tire is used.

Various changes may be made in the relative sizes of the felly, pneumatic tube and outer rim or tire and in the respective features or elements of the same as may be found desirable without departing from the scope of the invention as outlined by the following claim.

We claim—

A wheel for vehicles comprising a felly having a circumferential rib with a concaved face, transverse pins secured in said rib with their ends projecting on each side thereof, an outer tire of interlocked sections having upstanding portions to engage the sides of the rib, said portions having enlarged perforations to receive the ends of the transverse pins whereby said outer tire is secured to and permitted a limited radial movement on said felly, and a pneumatic tube or cushion fitted in the space between the face of the rib and the bottom of the groove formed by the upstanding side portions of the outer tire.

In testimony whereof we affix our signatures in presence of two witnesses.

LEO L. SAVOIE.
EMILE FRANÇOIS GENEVAY.

Witnesses:
RALPH PAYETTE,
T. R. WATKINS.

Copies of this patent may be obtained for five cents each, by addressing the "Commissioner of Patents, Washington, D. C."